(12) United States Patent
Kim

(10) Patent No.: US 9,674,555 B2
(45) Date of Patent: *Jun. 6, 2017

(54) METHOD FOR PROVIDING REAL-TIME SERVICE OF HUGE AND HIGH QUALITY DIGITAL IMAGE ON INTERNET

(71) Applicant: INNOTIVE CORPORATION, Seoul (KR)

(72) Inventor: Sung-Min Kim, Seoul (KR)

(73) Assignee: INNOTIVE CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,764

(22) Filed: Dec. 30, 2015

(65) Prior Publication Data

US 2016/0227256 A1 Aug. 4, 2016

Related U.S. Application Data

(63) Continuation of application No. 14/333,813, filed on Jul. 17, 2014, now abandoned, which is a (Continued)

(30) Foreign Application Priority Data

May 31, 2002 (KR) .......................... 10-2002-0030804

(51) Int. Cl.
*H04N 19/85* (2014.01)
*G06F 17/30* (2006.01)
(Continued)

(52) U.S. Cl.
CPC ......... *H04N 19/85* (2014.11); *G06F 17/3028* (2013.01); *G06F 17/30902* (2013.01);
(Continued)

(58) Field of Classification Search
CPC .......... G06F 17/3028; G06F 17/30902; G06Q 30/02; G06Q 30/0277; G06T 9/00; H04N 19/119; H04N 19/176; H04N 19/85
(Continued)

(56) References Cited

U.S. PATENT DOCUMENTS 6,898,313 B2   5/2005   Li et al.
6,950,101 B2   9/2005   Hunt et al.
(Continued)

FOREIGN PATENT DOCUMENTS

JP   09-055925 A   2/1997
JP   09-098405 A   4/1997
(Continued)

OTHER PUBLICATIONS

Office Action dated May 10, 2006 issued in U.S. Appl. No. 10/345,432.
(Continued)

*Primary Examiner* — Yon Couso
(74) *Attorney, Agent, or Firm* — KED & Associates, LLP

(57) ABSTRACT

A method for providing real time service of huge and high quality digital image on internet is disclosed, wherein data relevant to a general life such as a general photo, an advertising leaflet, and a pamphlet and professional image data exhibited in an art gallery, exhibition grounds, a pavilion are made into huge and high quality digital image or scanned and photographed to be digital, thereby processing real time service as an interactive browsing form. In the present invention, data are directly made, edited, constructed, and uploaded on internet, thereby providing various additional information with image through hyperlink and processing high quality digital image service on network without speed delay for huge image.

3 Claims, 11 Drawing Sheets

Related U.S. Application Data continuation of application No. 13/933,909, filed on Jul. 2, 2013, now abandoned, which is a continuation of application No. 13/230,989, filed on Sep. 13, 2011, now Pat. No. 8,503,829, which is a continuation of application No. 12/613,818, filed on Nov. 6, 2009, now Pat. No. 8,036,496, which is a continuation of application No. 11/713,813, filed on Mar. 5, 2007, now Pat. No. 7,634,144, which is a continuation of application No. 10/345,432, filed on Jan. 14, 2003, now Pat. No. 7,209,602.

(51) Int. Cl.
  *G06Q 30/02* (2012.01)
  *G06T 9/00* (2006.01)
  *H04N 19/176* (2014.01)
  *H04N 19/119* (2014.01)

(52) U.S. Cl.
  CPC ......... *G06Q 30/02* (2013.01); *G06Q 30/0277* (2013.01); *G06T 9/00* (2013.01); *H04N 19/119* (2014.11); *H04N 19/176* (2014.11)

(58) Field of Classification Search
  USPC .......................................................... 382/232
  See application file for complete search history.

(56) References Cited

U.S. PATENT DOCUMENTS

2002/0196372 A1 12/2002 Ito et al.
2003/0165273 A1 9/2003 Berkner et al.
2005/0024677 A1 2/2005 Miura et al.

FOREIGN PATENT DOCUMENTS

| JP | 09-214932 A | 8/1997 |
| JP | 09-288694 A | 11/1997 |
| JP | 10-150639 A | 6/1998 |
| JP | 11-219364 A | 8/1999 |
| JP | 2000-067223 A | 3/2000 |
| JP | 2002-027233 A | 1/2002 |

OTHER PUBLICATIONS

Office Action dated Oct. 16, 2007 issued in U.S. Appl. No. 11/713,813.
Final Office Action dated Jul. 25, 2008 issued in U.S. Appl. No. 11/713,813.
Office Action dated Feb. 11, 2009 issued in U.S. Appl. No. 11/713,813.
Office Action dated Dec. 2, 2010 issued in U.S. Appl. No. 12/613,818.
Office Action dated Feb. 2, 2012 issued in U.S. Appl. No. 13/230,989.
Final Office Action dated Sep. 6, 2012 issued in U.S. Appl. No. 13/230,989.
Office Action dated Mar. 4, 2015 issued in U.S. Appl. No. 14/333,813.

METHOD FOR PROVIDING REAL-TIME SERVICE OF HUGE AND HIGH QUALITY DIGITAL IMAGE ON INTERNET

CROSS-REFERENCE TO RELATED APPLICATIONS

This application is a Continuation application of prior U.S. patent application Ser. No. 14/333,813 filed Jul. 17, 2014, which is a Continuation application of prior U.S. patent application Ser. No. 13/933,909 filed Jul. 2, 2013, which is a Continuation application of prior U.S. patent application Ser. No. 13/230,989 filed Sep. 23, 2011 (now U.S. Pat. No. 8,503,829), which is a Continuation application of prior U.S. patent application Ser. No. 12/613,818 filed Nov. 6, 2009 (now U.S. Pat. No. 8,036,496 issued Oct. 11, 2011), which is a Continuation application of prior U.S. patent application Ser. No. 11/713,813 filed Mar. 5, 2007 (now U.S. Pat. No. 7,634,144 B2 issued Dec. 15, 2009), which is a Continuation application of prior U.S. patent application Ser. No. 10/345,432 filed Jan. 14, 2003 (now U.S. Pat. No. 7,209,602 B2 issued Apr. 24, 2007), which claims priority under 35 U.S.C. §119 to Korean Application No. 30804/2002 filed on May 31, 2002, whose entire disclosure is hereby incorporated by reference.

BACKGROUND OF THE INVENTION

1. Field of the Invention

The present invention relates to a service of high quality digital image through internet, and particularly, to a method for providing various information through interactive user interface, wherein image data and each kind of professional data commonly used in daily life are provided to enhance utilization of image data.

2. Description of the Background Art

In the related art, since data such as an advertising leaflet, a propaganda is booklet, a handbill, a pamphlet, and etc. are almost used for one time, advertisement and publicity effect is not great and the data did not last for a long time. Also, professional data include each kind of works of art, photo works exhibited in an art gallery and a pavilion. The data provide simple information and there was an inconvenience to visit an art gallery or a pavilion to appreciate the corresponding works.

In the related art, even if an art gallery or gallery service are provided through internet and various internet-album services are performed, enormous image corresponding to hundreds of sheets or ten thousands of sheets and enormous image corresponding to scores of MB or hundreds of MB were not processed in a constant network bandwidth, thereby limiting quality and size of service image. That caused image quality to be degraded and made it almost impossible to provide additional information (moving image, sound, and etc.) with image. That is resulted from that a limitation about a method for providing huge image real time through network is not overcame. Also, since image information is downloaded and then displayed on a screen, it was impossible for users to appreciate high quality works real time.

SUMMARY OF THE INVENTION

Therefore, an object of the present invention is to provide a method for utilizing high quality image as a synthetic medium, wherein general image data such as a photo, an advertising leaflet, a handbill, a propaganda booklet, a pamphlet, and etc. and professional image data such as art works and professional photo works are digitally made into huge and high quality, thereby providing the contents into high quality image through wire and wireless network and connecting the contents with relevant additional information.

To achieve these and other advantages and in accordance with the purpose of the present invention, as embodied and broadly described herein, there is provided a method for providing real time service of huge and high quality digital image on internet, wherein a server system for communicating with a plurality of client systems on internet and providing information by a request of the client system, comprises a high quality image conversion system for converting digital image into high quality image data format; an editing system for editing and reconstructing the converted data; and a database for storing the edited data, the system comprising the steps of editing and reconstructing the converted data; storing the edited data; and transmitting the stored data to the client system on internet at the time of request by the client system.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
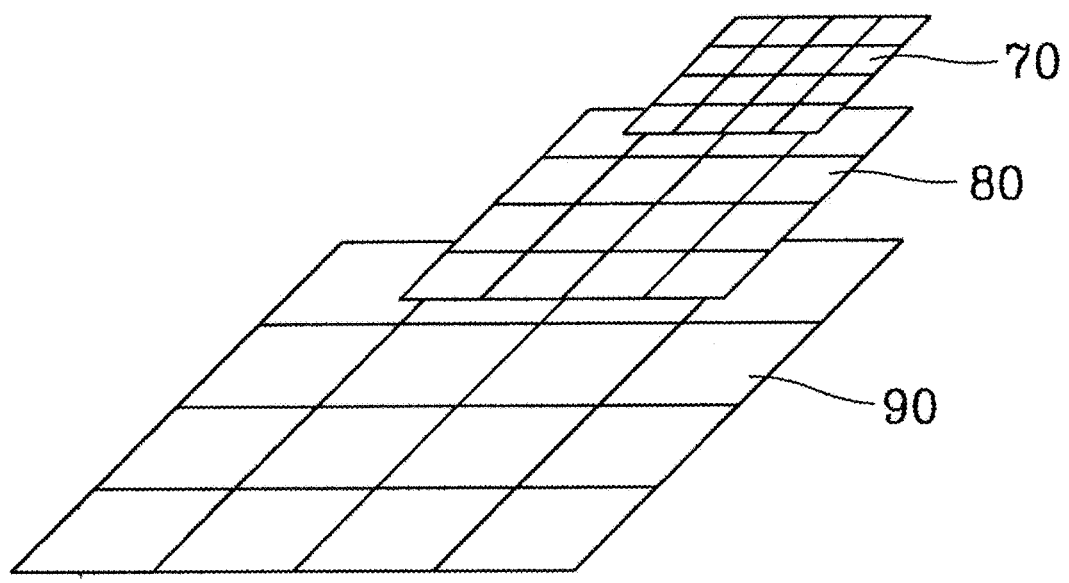
FIG. 1 is a pattern diagram showing layered data.

Reference will now be made in detail to the preferred embodiments of the present invention, examples of which are illustrated in the accompanying drawings.

In a method for providing real time service of huge and high quality digital image on network, are processed small images transformed to be suitable to a main memory unit of a general personal computer. Accordingly, any huge image can be displayed in a user computer real time, and hyperlink such as another huge image, animation, and other media files can be provided with the huge image.

To this end, a new client/server model for transmitting huge image on internet is installed.

Characteristics of the present invention are as followings.

First, image encoding based on partial access.

Second, temporal storage (caching) of image information corresponding to a display screen in a client system where image information is transmitted and removal of unnecessary image.

Third, intellectual queuing and pipelining of a server which provides image information.

Image Encoding

Partial access divides very huge image into small sub cells, and converts into layered data having multiple zoom levels. That is, in the present invention, sub cells converted into high quality image data are transmitted instead of transmitting an overall huge image, thereby improving image-processing speed. Since users do not look an entire huge image by high resolution, only sub cells displayed on a screen are transmitted from database and displayed in the client system. Accordingly, amount of unnecessary data transmitted through network is largely reduced, thereby fast transmitting and displaying. Image division and layered data generation in the partial access will be later described.

Client System

If a user is connected to a server through internet, a client application is automatically transmitted from a server system to a client system. The application tracks a user's input contents and determines a position of a view pointer of which movement is determined on a screen by moving a mouse. According to that, necessary corresponding sub cells are all transmitted from the server and displayed. To minimize a loading on network, the client system temporarily stores sub cells around the view pointer. When a user searches image around the view pointer, relevant sub cells already exist in a memory. Therefore, a request for additionally transmitting image file is not needed.

If a user moves the view pointer, the client application requests sub cells regarding to a new image to the server. In the process, time delay can be generated at the time of transmitting data on network and processing in the server. However, if a user moves the view pointer and requests a new image, sub cells regarding to previous image are not needed any longer. The client application can additionally request the server to delete the sub cells, and by the request, load on network can be reduced.

Server System

Queue is a data structure in computer programming for removing data according to input orders. According to an intellectual queuing in the present invention, input and display are minimized in dealing with image request from numerous clients. For example, if a client A requests sub cells 1, 2, 3 and 4 and a client B requests 3, 4, 5 and 6, a queuing layer receives the sub cells 1, 2, 3, 4, 5 and 6 as one order without overlapping the sub cells 3 and 4. Accordingly, if numerous clients simultaneously request overlapped information, processing amount in the server is reduced, thereby processing fast.

In the meantime, the server system asynchronously processes numerous requests from the client by using pipelining. Generally, if users request to the server, they wait a response from the server for a while. If the server can not perform one request, a series of requests from the client are interrupted. In the present invention, a client can simultaneously transmit numerous requests to a server through pipelining.

A pipeline means that movement of command words towards a processor or an arithmetical step by the processor to perform the command words are consecutive and overlapped. If a pipeline does not exist, a processor in computer takes first command words from a memory, performs a calculation requested by the command words, then takes next command words from the memory. While taking the command words, an arithmetical calculation part of the processor has to rest with waiting for next command words to arrive.

If the pipeline is used, it is possible to take next command words while the processor performs an arithmetical calculation and bring the words to a buffer around the processor until next command words are performed. A step for bringing command words is continuously repeated. As a result, a number of command words performed in a set time is increased.

In the present invention, the server allocates a special address for each request transmitted from numerous clients, and immediately transmits a response to the client as soon as the request is performed. At this time, the transmitting order needs not to be equal to an order which the server receives a request. By the pipelining, the server can respond to the client system faster than a user's expectation.

Image Encoding

In the present invention, digital information including huge image information is converted into high quality digital image data on the basis of partial access by the following processes.

(1) converting huge image into multiple layered data with levels (2) dividing the huge image into numerous sub cells (3) compressing the images into divided cell units To convert into high quality image data, general image files such as BMP, GIF, PNG, JPG, etc. are used as original text contents. Also, some advertisement data made by PDF are converted into image file for use.

Layered Data Generation

In the present invention, image data having a layered structure are generated so as to provide high quality image in which images of multimedia digital publication and etc. transmitted real time on network are magnified or contracted fast and accurately according to levels. That is, a plurality of data layers converted with ½", ..., ¼, ½, 1 times, etc. of an original image are generated.

FIG. 1 is a pattern diagram showing layered data with magnification or contraction levels. As shown in FIG. 1, high quality individual images are constituted by layers according to displayed levels at the time of magnification or contraction, and respective layers 70, 80, and 90 are used in magnification or contraction steps. That is, in case of magnifying, images are displayed from upper data 70 to bottom data 90 via middle data 80. On the contrary, in case of contracting, images are displayed in reverse order. Also, it is possible to change the displayed screen discontinuously.

A number of layers in the layered structure are determined by graphic user interface (GUI). In FIG. 1, data layers of three steps are illustrated, but if graphic user interface can provide a function of magnification or contraction with four steps, image data are converted to have four layers.

Division of Huge Image

The generated data layers are divided into a plurality of sub cells. By dividing the data, huge image is fast transmitted. Division units of the huge image into a plurality of sub cells are determined by a processing ability of a client system and a transmittance speed on network. At this time, a number of sub cells are determined within an optimum scope. Indexes are endowed to each cell of the divided images, and the images are integrated by positions or orders. The integrated cells exist as one file, but only corresponding cells of the huge image are transmitted by a client's request. According to this, a client can fast see his wanted image.

Figure 2:
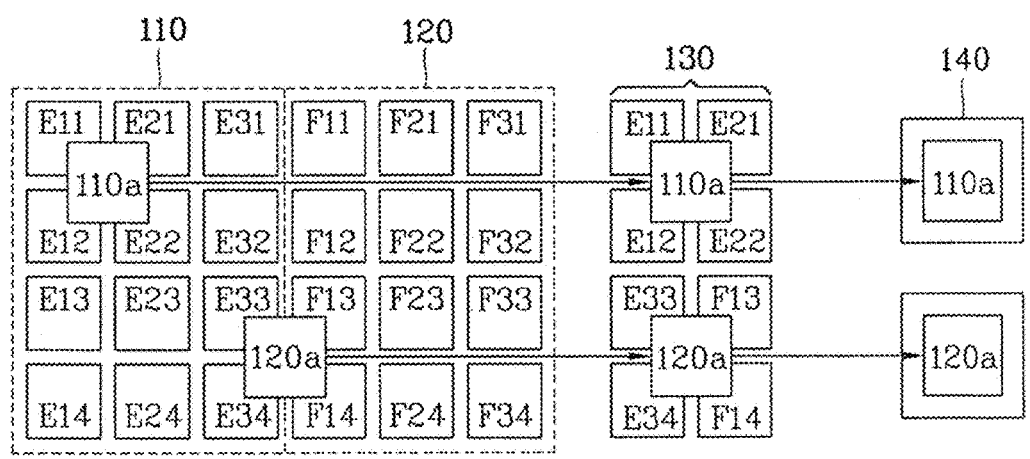
FIG. 2 is a pattern diagram showing a process in which huge image is divided and transmitted.

Referring to FIG. 2, a process for displaying the divided image data real time on network will be explained. Individual image data 110 and 120 stored in database consist of sub cells respectively. In Figure, Eij and Fij represent sub cells of i line and j column.

As aforementioned, dividing image data into each sub cell unit and then storing is determined by a processing ability of a client system and a transmittance speed on network. At this time, if a large number of sub cells are divided, a processing speed in a central processing unit of a client system is down, and if few sub cells are divided, a transmittance speed on network is down. Therefore, it is important to divide the sub cells within an optimum scope.

For example, supposing that screen display resolution is 1024.times.768 pixel, images displayed on a screen-are divided into 5 horizontal sub cells and 4 vertical sub cells. The cells divided at an optimum condition prevent delay in a transmitting process or in a display process, and transmit image fast.

The divided sub cells are compressed, and endowed with indexes, so that positions and coordinates etc. in an overall image are recorded. Then, the sub cells are integrated into one file and stored in database.

High quality image data according to the present invention are stored as a compressed form so as to improve a transmittance speed.

It is preferable to compress data into each divided sub cell unit. At this time, compression technique such as widely known JPEG, GIFE are used. Each sub cell can be compressed with a same method independently, or compressed with different methods. For example, in case of data having a figure and a picture together, GIF compression is used at the figure and JPEG compression is used at the picture. By doing so, it is possible to improve compression efficiency of an image.

The compressed sub cells are integrated according to orders and positions, and are endowed with indexes respectively, then stored in database. The indexes can include not only base information of sub cells but also additional information relevant to the sub cells. A server system is connected to the indexes and selects sub cells of a wanted image, thereby fast transmitting.

Hereinafter, the present invention will be explained in detail with reference to preferred embodiments.

Figure 3:
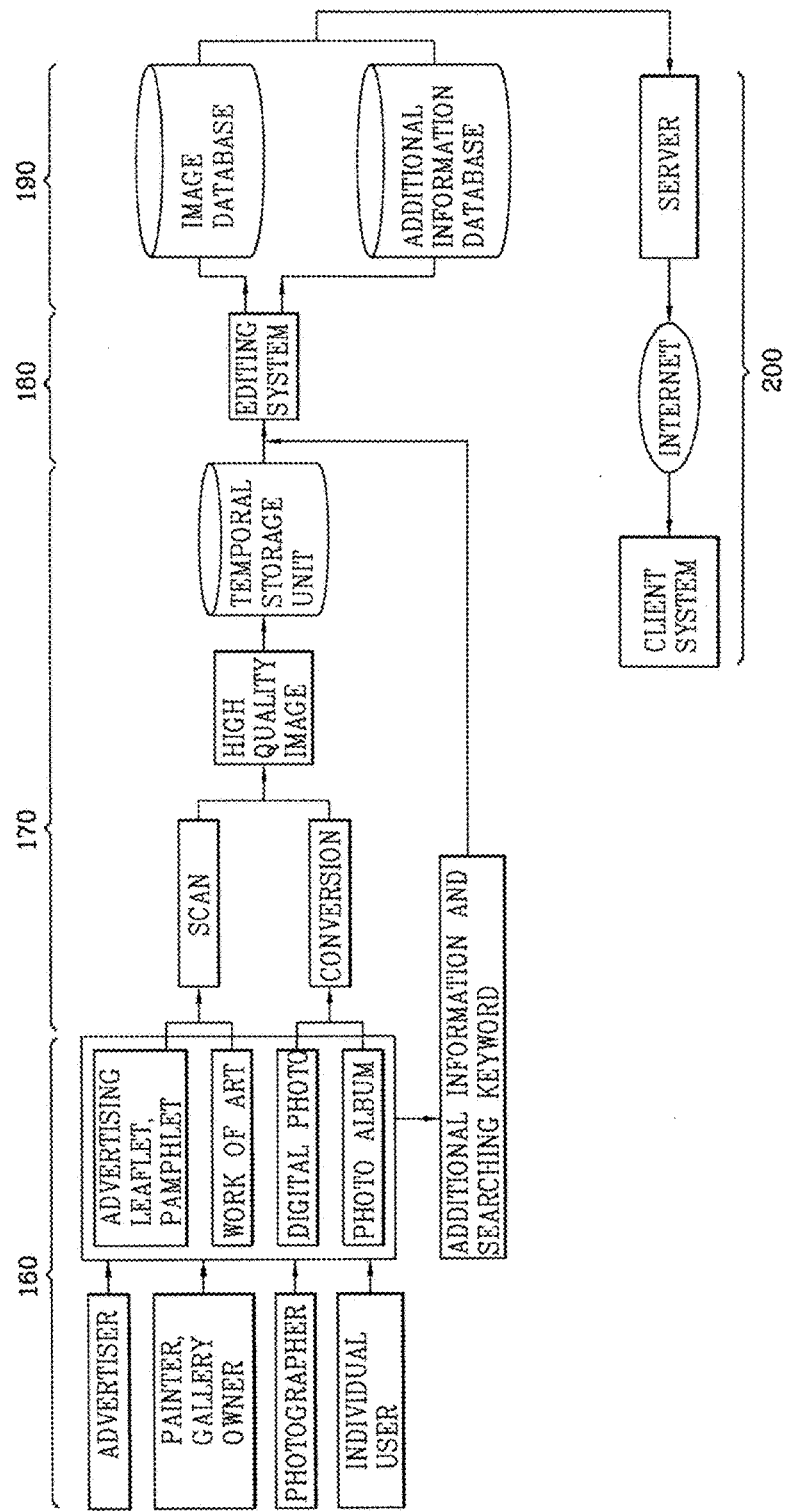
FIG. 3 is a flow chart showing an overall process of a system for high quality digital image internet service according to the present invention.

FIG. 3 is a flow chart showing an overall process of a system for high quality digital image internet service according to the present invention. First of all, contents are collected from an advertiser, a painter, a photographer, or individual users (160). In the contents-collecting step, additional information regarding to each content, for example, moving image file, sound file, text explanation data, etc. are together included. The collected contents are converted into image files, or scanned to be converted into digital information, thereby being made into high quality image data according to the present invention (170). The high quality image data can be edited in a temporarily stored state (180). High quality image data having completed edition are respectively stored in image database and additional information database (190), and transmitted from the server to the client system through internet by a client's request. The process will be explained as follows.

All kinds of contents off line, for example, a general photo, an advertising leaflet, a propaganda booklet, a pamphlet, a work of art, and etc. are scanned or converted into a digital photo, thereby being made into high quality digital image data. High quality data can be constituted with index data including additional information (moving image, sound, flash animation, and web page, etc.) or individually extracted keywords necessary to search.

The completed high quality digital image can be individually stored or stored by reconstructing the relevant contents as one package form. In the case, a separate program for edition can be used. Details for that will be later explained.

The server system transmits corresponding image regions (sub cells corresponding to parts requested by users) according to users' requests through internet by a program (client application) for real time serving the converted contents into high quality image data. In the client system, contents can be real time browsed by a browser such as internet explorer, and etc.

A method for a user to generate high quality image data according to the present invention includes a download method and a method using a server program.

In the download method, high quality image conversion program is downloaded to be installed in a user's computer system, then, general image data are converted into high quality image, thereby uploading to an internet server. In the method using a server program, a user uploads a general image to the server, then directly makes high quality image on internet by using programs installed to the server. In the present invention, a user and a server are interactive by communicating each other, thereby more satisfying a user's request and maximizing a service effect by a user's participation.

The high quality image data made in the above process are stored in a temporal storage unit of the server.

A method of the present invention includes an editing process for directly constituting a gallery or an internet album site by using high quality image data besides a making process for making high quality image data by a user. The temporarily stored high quality image passes an editing process shown in FIG. 4*a* or 4*c*.

Figure 4A:
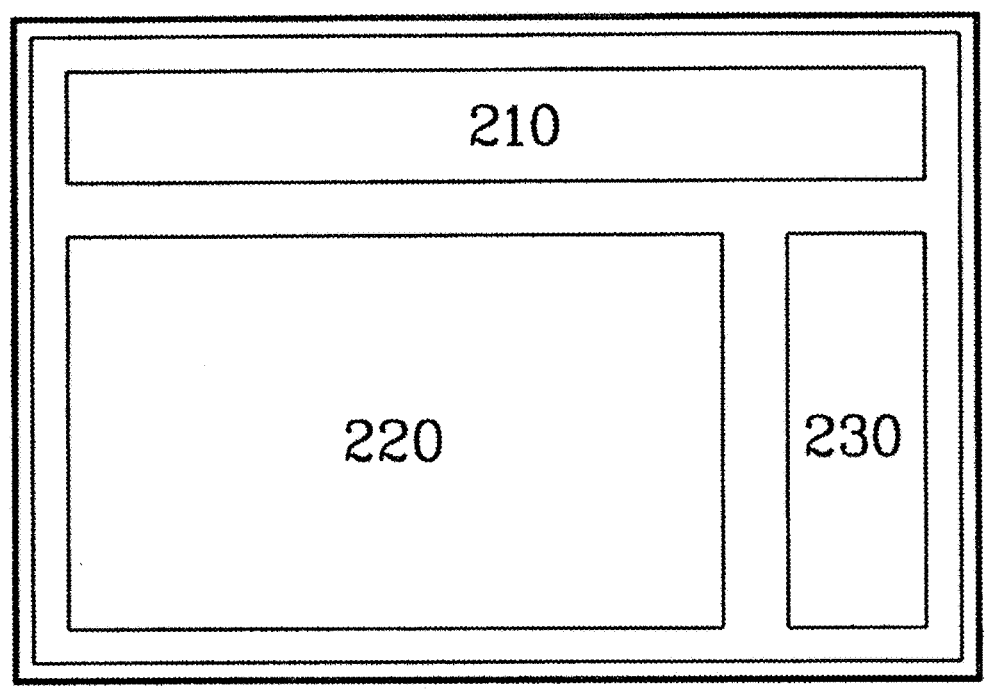
FIG. 4a is a pattern diagram showing graphic user interface (GUI) of high quality image edit program.
Figure 4B:
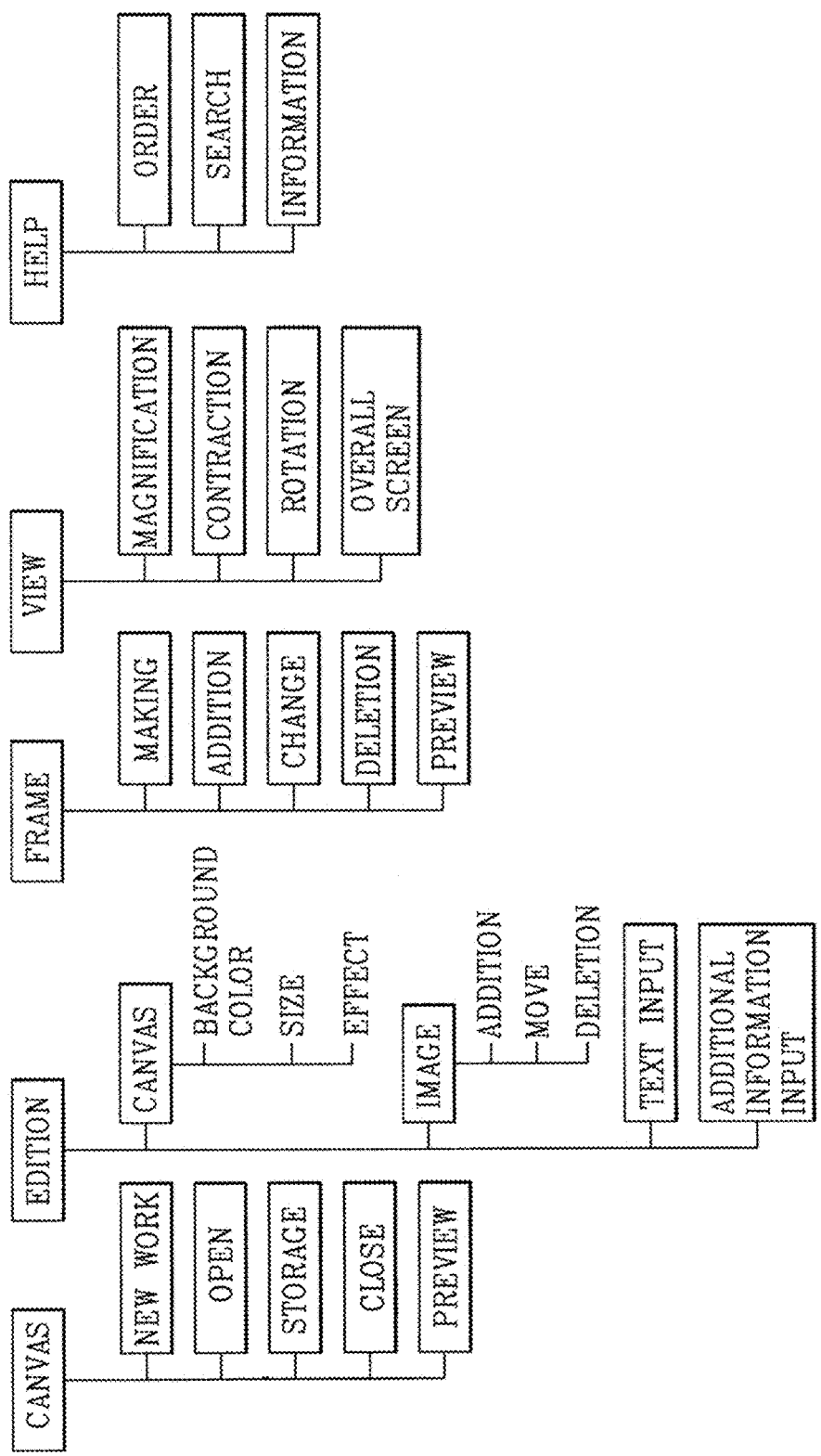
FIG. 4b is a pattern diagram showing GUI of a menu region of high quality image edit program.

FIG. 4*a* is a pattern diagram showing one embodiment of GUI of high quality image editing program. The editing program consists of a menu region 210, a working region 220, and a tool-collecting region 230. FIG. 4*b* shows one embodiment of the menu region 210. The menu region includes menus such as canvas, edition, panel, view, help, and etc., or can include sub menus according to each function.

The working region 220 is a space where high quality image is brought to perform various workings.

In the tool-collecting region 230, shortened icons of frequently used menus and special menus are made, thereby making the working convenient.

Figure 4C:
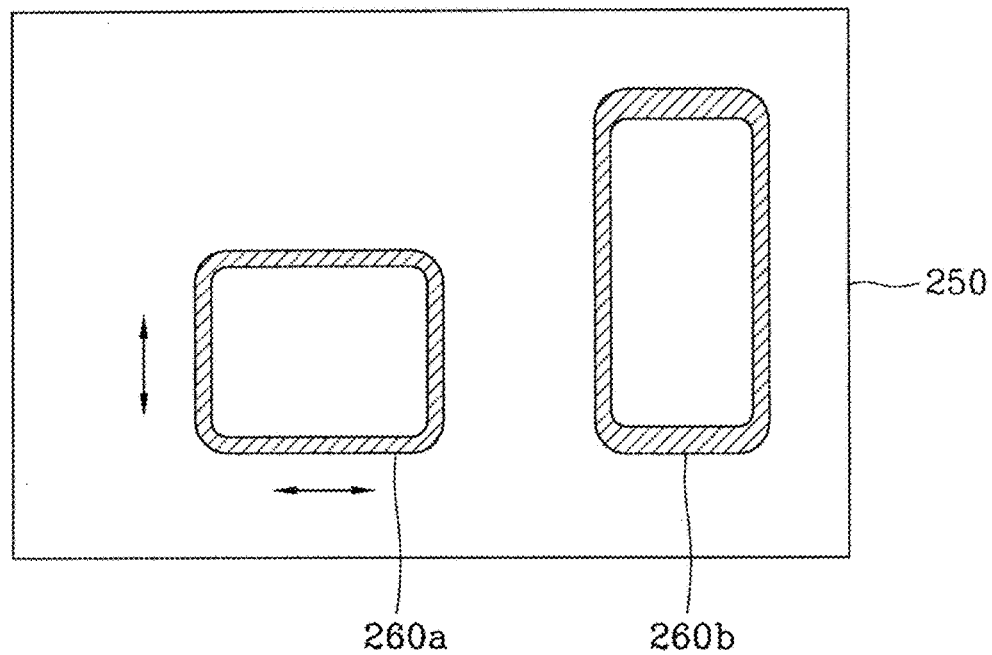
FIG. 4c is a pattern diagram showing GUI of a working region of high quality image edit program.

A user can store image data as individual image by using an editing program, or can store as a canvas unit by constituting the necessary image data as one package form. Also, it is possible to add a panel to each high quality image data, and to connect multimedia additional information such as moving image, sound, flash, and etc. with a text. In case of storing image data as a canvas unit, as shown in FIG. 4c, several high quality images 260a and 260b are brought in one canvas (working region) 250, then a user sets and changes size, color, multimedia additional information, text, position, and etc.

High quality image or canvas completed by using the editing program are stored in a separate database.

Since the editing program is performed in a server, a user is connected to the server to use the editing program and then the completed high quality image lo or canvas are stored in a separate database.

Figure 5:
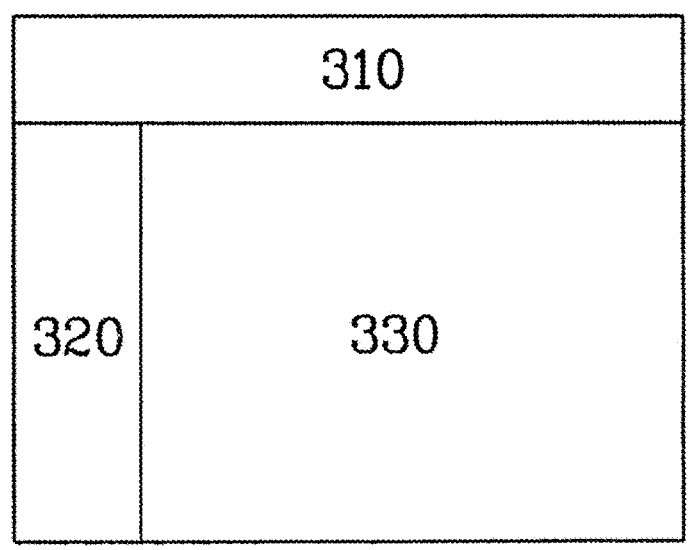
FIG. 5 is a pattern diagram showing one embodiment of GUI of high quality digital image service according to the present invention.

FIG. 5 is a pattern diagram showing a user interface for displaying high quality image display. The user interface consists of a function button region 310, a section menu and searching region 320, and an image display region 330.

The function button region 310 includes a tool for selecting contents according to kinds, a tool for selecting a part of displayed image, a tool for displaying the selected region, and a scrap function for storing the selected region or individual images as another file.

In the section menu and searching region 320, contents are sub-classified by constructions, and corresponding image information is included. The searching region consists of a part for inputting a searching keyword and a part for showing a searching result. The searching result is shown at a bottom of the section menu as a list form.

In the image display region 330, selected images are displayed. GUI shown in FIGS. 4a and 5 is only one embodiment, and other transformed GUI will possibly be provided.

Figure 6A:
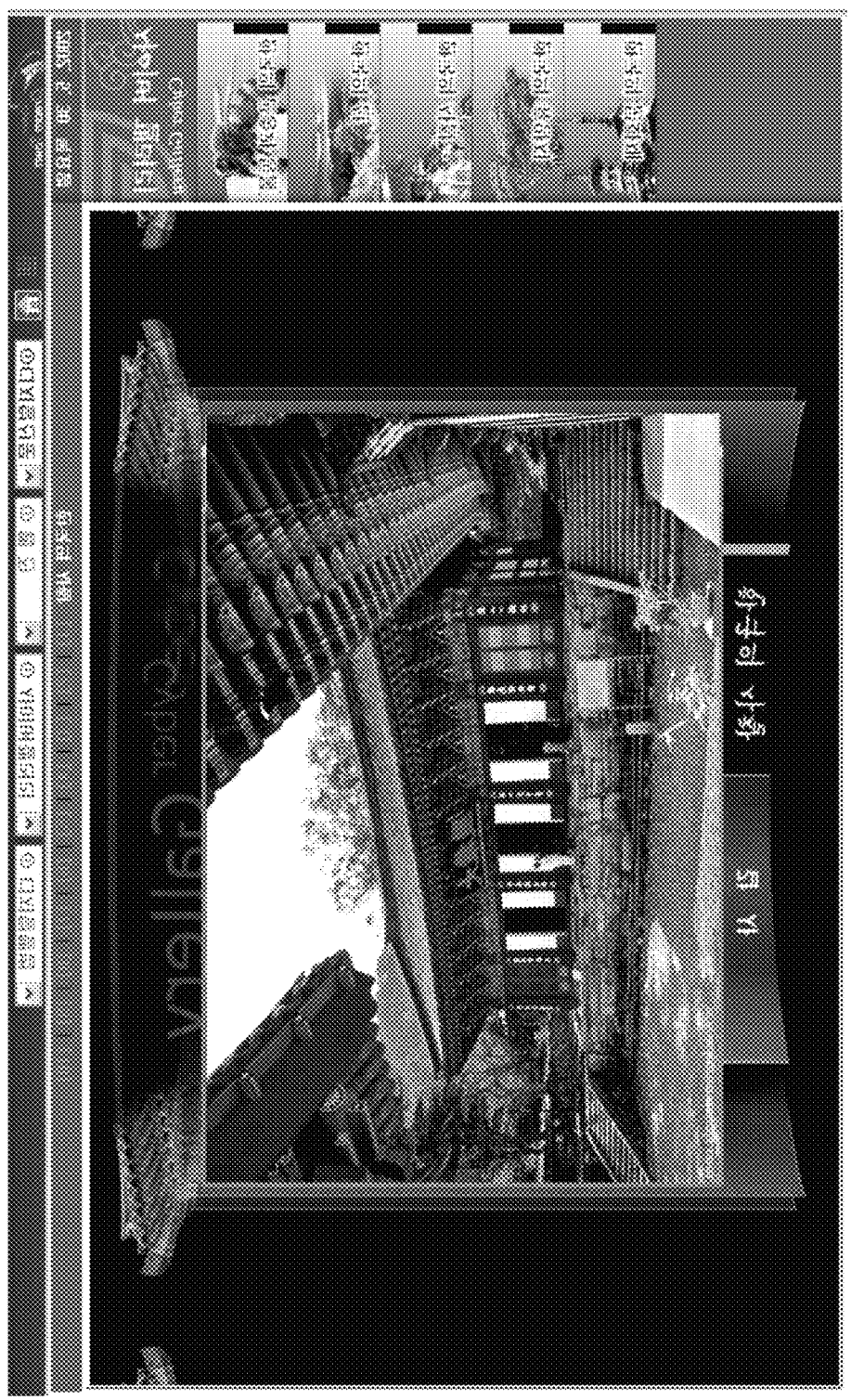
FIG. 6a is a screen capture showing one embodiment of GUI of a cyber gallery according to the present invention.
Figure 6B:
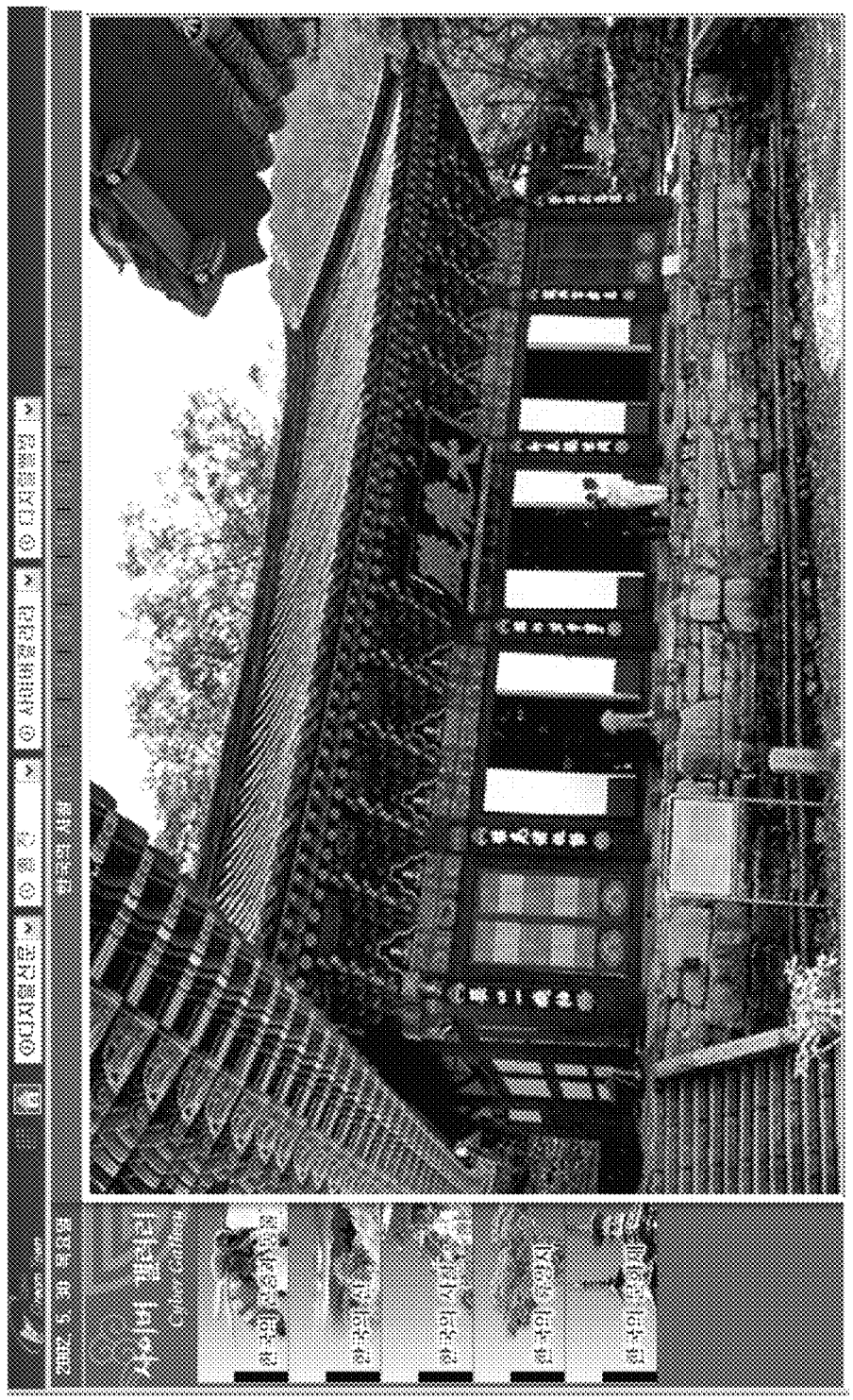
FIG. 6b is a screen capture showing one embodiment of zoomed-in GUI of a cyber gallery according to the present invention.

FIGS. 6a and 6b are preferred embodiments according to the present invention showing a digital gallery to which a method of the present invention is applied.

Figure 7A:
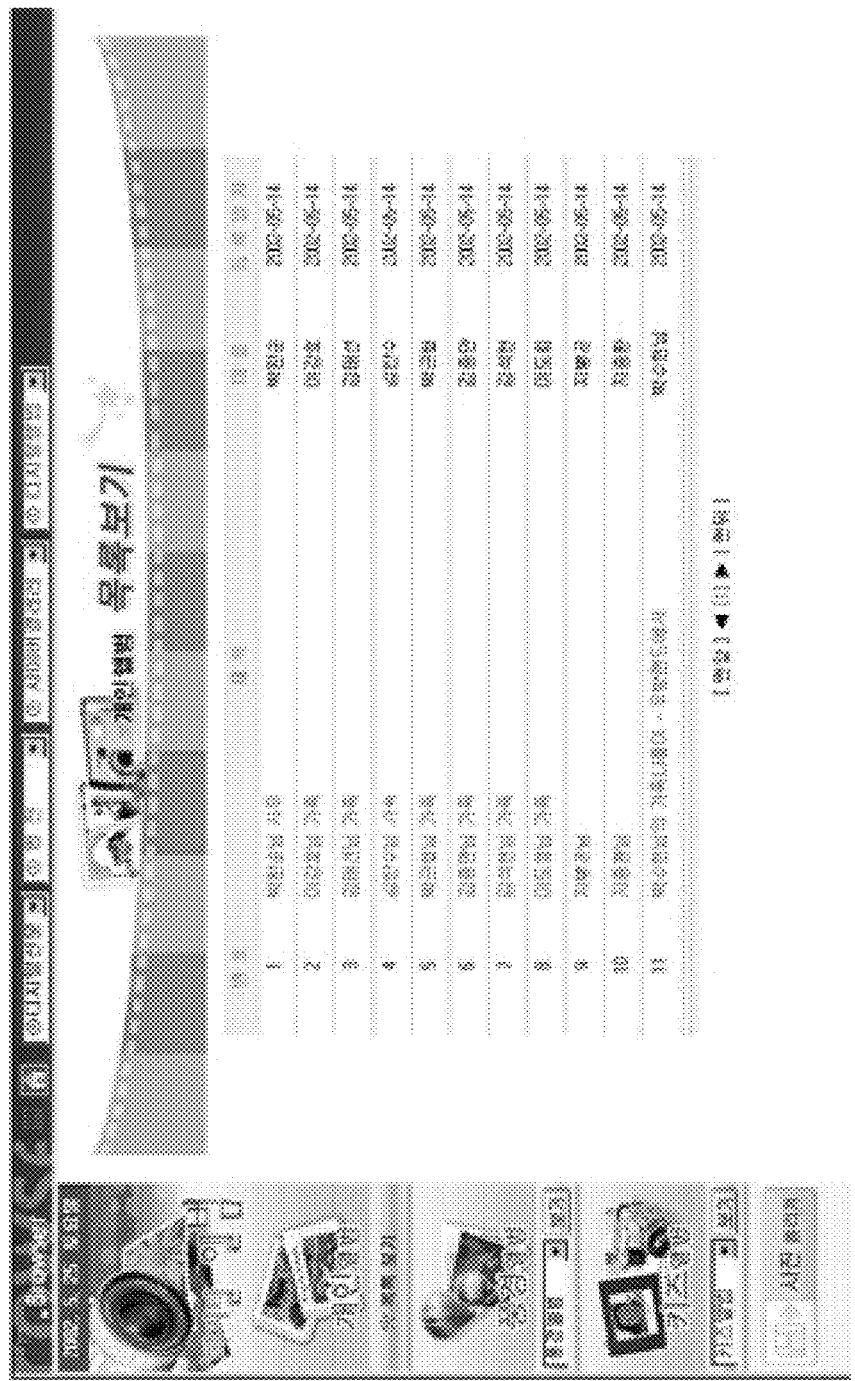
FIG. 7a is a screen capture showing one embodiment of GUI in which a user transmits a photo to a server in an internet album according to the present invention.
Figure 7B:
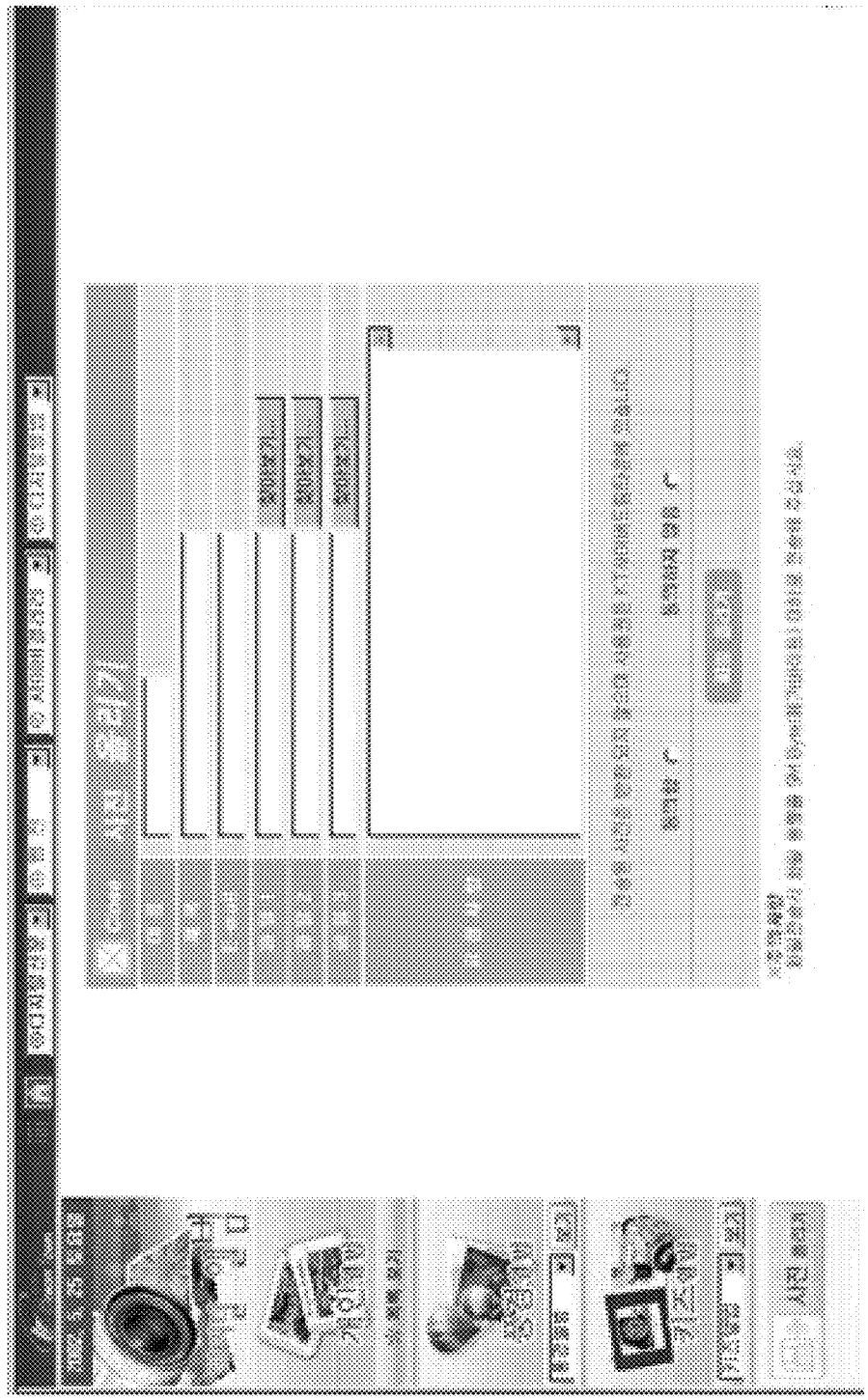
FIG. 7b is a screen capture showing one embodiment of GUI showing completed album lists in an internet album according to the present invention.

In the meantime, FIGS. 7a and 7b are preferred embodiments according to the present invention showing a digital album to which a method of the present invention is applied.

Figure 7C:
FIG. 7c is a screen capture showing one embodiment of GUI of an internet album according to the present invention.
Figure 7D:
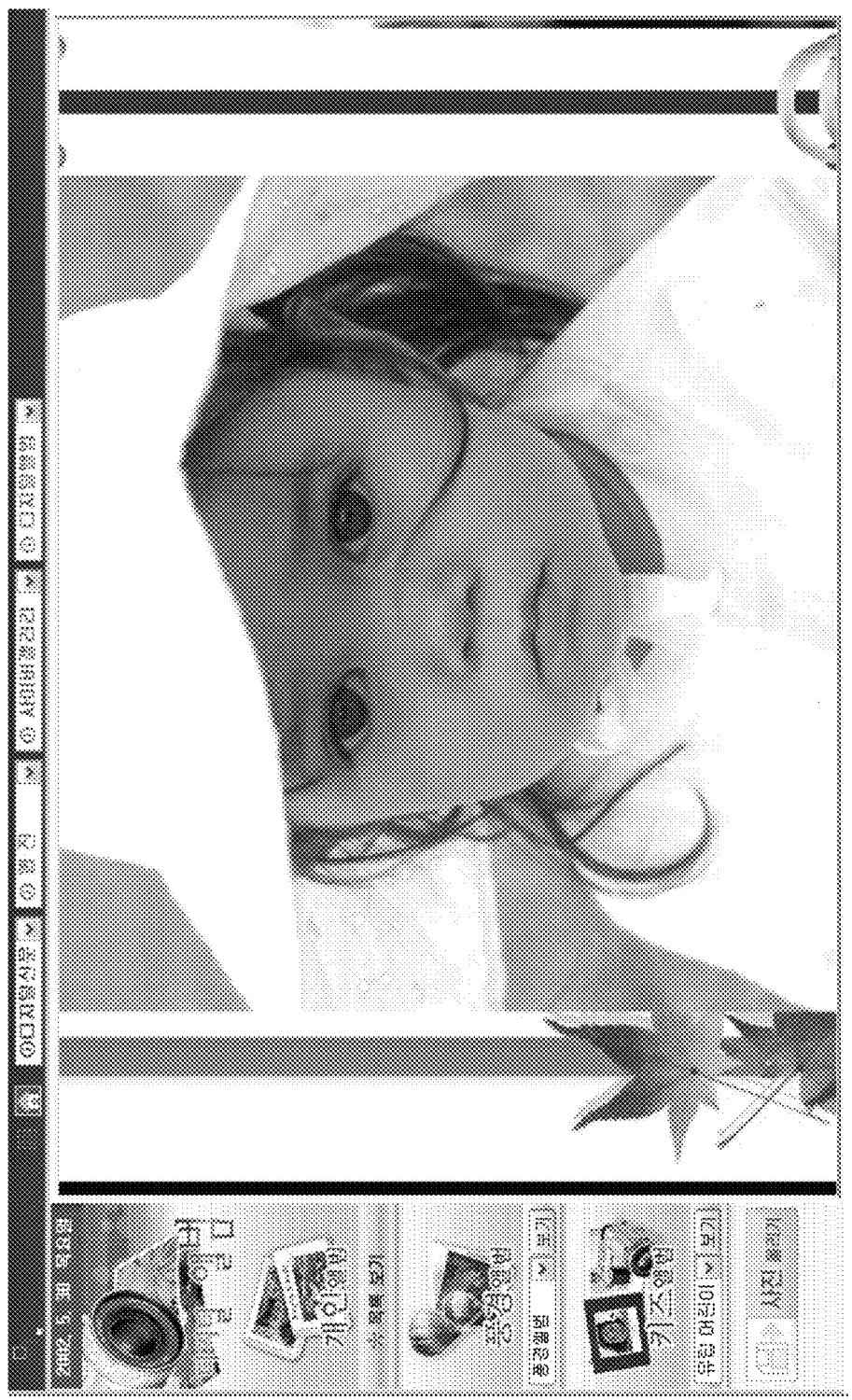
FIG. 7d is a screen capture showing one embodiment of zoomed-in GUI of an internet album according to the present invention.

FIG. 7a is a screen capture showing one embodiment of GUI in which a user transmits a photo to a server in an internet album according to the present invention. FIG. 7b is a screen capture showing one embodiment of GUI showing completed album list in an internet album according to the present invention. FIG. 7c is a screen capture showing one embodiment of GUI of an internet album according to the present invention. FIG. 7d is a screen capture showing one embodiment of zoomed-in GUI in an internet album according to the present invention.

High quality image transmitted from database of the server can be displayed by various methods.

High quality image data are transmitted with only regions displayed on a screen by a user's request. That is, if a user moves images by using a mouse, only newly displayed region is transmitted from the database and displayed. Therefore, the user moves high quality digital image to any wanted directions. Also, if the user clicks a wanted part with a mouse, the part can automatically move to a center of a screen.

Image magnification or contraction function is performed by locating a mouse cursor to a wanted part and clicking. The magnification or contraction can be performed by a layer unit step by step, or can be performed at one time from the highest step to the lowest step. At this time, the new data are displayed by receiving data from the server. In case of magnifying or contracting image, various effects can be simultaneously realized by using contents such as sound, image, text, and flash animation, etc.

In case that hyper-linked additional information exists at a special position of image, the corresponding information is displayed on a screen real time. At this time, the additional information can be displayed on a current window, or on a new window. Additional information data that will be used with high quality image includes moving image file, sound file, flash animation, another high quality image file, text information, and web page address, etc.

The present invention has the following advantages. According to the real time service of high quality multimedia digital gallery and the method of the present invention, image data and additional data interactive to one another are provided by one graphic user interface. As a result, a user can simultaneously obtain various information easily, can fast search wanted information on an image screen which is fast displayed, and can obtain the same resolution even if at the time of magnifying the screen to search minute information. Therefore, a user is provided with individual images close to intuition and can use various additional information.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of transferring at least one image to at least two client systems, comprising:
   dividing an image into a plurality of sub cells, each sub-cell comprising a portion of the image;
   receiving a first request from a first client system for a first prescribed number of sub-cells;
   receiving a second request from a second client system for a second prescribed number of sub-cells;
   intellectual queuing of sub-cells upon overlap of sub-cells requested by the first and second client systems such that the number of sub-cells queued is less than a total of the first and second prescribed number of cells by a number of overlapped sub-cells;
   sending the first prescribed number of sub-cells from the queued sub-cells to the first client system; and
   sending the second prescribed number of sub-cells from the queued sub-cells to the second client system.

2. The method of claim 1, further comprising pipelining the first and second requests.

3. The method of claim 1, wherein the image comprises one of original image or an additional layer of the original image, which has been magnified or reduced in image size.

* * * * *